United States Patent [19]

Ito

[11] Patent Number: 5,625,423
[45] Date of Patent: Apr. 29, 1997

[54] INFRARED RAY GENERATING APPARATUS AND OPERATION DESIGNATING SYSTEM FOR USE WITH ELECTRONIC APPARATUS

[75] Inventor: Natsuo Ito, Kanagawa, Japan

[73] Assignee: Sony Corporation, Tokyo, Japan

[21] Appl. No.: 454,066

[22] Filed: May 30, 1995

[30] Foreign Application Priority Data

May 31, 1994 [JP] Japan .................. 6-141239

[51] Int. Cl.$^6$ .................. H04N 5/76; H04N 7/18
[52] U.S. Cl. .................. 348/734; 348/732; 386/46
[58] Field of Search .................. 348/734, 732, 348/731; 358/335, 310, 327, 342; 360/79; H04N 5/50, 5/44, 7/18, 5/76

[56] References Cited

U.S. PATENT DOCUMENTS

| | | | |
|---|---|---|---|
| 5,123,046 | 6/1992 | Levine | 380/10 |
| 5,151,789 | 9/1992 | Young | 348/734 |
| 5,303,063 | 4/1994 | Kim et al. | 358/335 |
| 5,365,282 | 11/1994 | Levine | 348/734 |
| 5,448,370 | 9/1995 | Kim et al. | 358/335 |
| 5,455,636 | 10/1995 | Furrey et al. | 348/731 |
| 5,473,442 | 12/1995 | Kim et al. | 358/335 |

FOREIGN PATENT DOCUMENTS

| | | | |
|---|---|---|---|
| 210605 | 8/1993 | Japan | G06F 13/00 |
| 210613 | 8/1993 | Japan | G06F 13/14 |

Primary Examiner—Glenton B. Burgess
Attorney, Agent, or Firm—Jay H. Maioli

[57] ABSTRACT

An infrared ray generating apparatus includes a control device for converting a command signal of a first format into a command signal of a second format, a switch for selecting an input command signal or the command signal of the second format converted by the control means, and an infrared ray generating device for causing the switch device to select the command signal of the second format converted by the control device when the input command signal is not in accord with the second format and to select the input command signal when the input command signal is in accord with the second format and for generating an infrared ray signal corresponding to the command signal that is output from the switch.

5 Claims, 5 Drawing Sheets

INFRARED RAY GENERATING APPARATUS AND OPERATION DESIGNATING SYSTEM FOR USE WITH ELECTRONIC APPARATUS

BACKGROUND OF THE INVENTION

1. Field of the Invention

The present invention relates to an infrared ray generating apparatus for use with a cable mouse for allowing a cable box that receives for example a cable TV program to be controlled using a VCR and an operation designating system for use with an electronic apparatus for allowing a cable box that receives a cable TV program to be controlled using a VCR.

2. Description of the Related Art

When a cable TV program is received, a cable box is used. The cable box has a tuner circuit that selects a desired channel and a decode circuit that demodulates and decodes output from the tuner circuit. The cable box is usually supplied by a cable TV company with which the user has a subscription contract. Thus, the specifications of cable boxes can vary from company to company. By connecting a cable box to a TV receiver, a picture signal transmitted through a cable is received by the TV receiver.

When the cable box is connected to the TV receiving a receive channel is selected by a tuner circuit in the cable box. Thus, it is difficult to reserve a program with a VCR. In other words, when a program is reserved by the VCR, a channel is designated by a tuner in the VCR. However, when the cable box is connected to the TV receiver, a channel cannot be designated by the tuner in the VCR when the cable box is connected to the TV receiver. Thus, a program cannot be reserved by the VCR.

To solve such a problem, a cable mouse is used. When the cable mouse is connected to the VCR and the cable mouse is positioned on an infrared ray receiving portion of the cable box, the cable box can be controlled by the VCR.

FIG. 6 is a schematic diagram showing an example of such an system. In FIG. 6, reference numeral 101 is a cable box. Reference numeral 102 is a VCR. Reference numeral 103 is a TV receiver. A cable mouse 104 is connected to the VCR 102. The cable mouse 104 is positioned on an infrared ray receiving portion 106 of the cable box 101. Reference numeral 106 is a commander that controls the VCR 102.

The cable box 101 is connected to a cable TV broadcasting station through a cable. The cable box 101 selects a desired channel and decodes a TV signal on the selected channel. The TV signal that is decoded by the cable box 101 is supplied to the VCR 102 and the TV receiver 103.

The cable mouse 104 is used to control the cable box 101 using the VCR 102. The cable mouse 104 is constructed as shown in FIG. 7. In FIG. 7, a command signal CMD10 is supplied from a microprocessor of the VCR 102 through an input terminal 111. The command signal CMD10 is supplied to a microprocessor 112 of the cable mouse 104. The microprocessor 112 converts the command signal CMD10 into a command signal CMD11 that is peculiar to the cable box 101. The command signal CMD11 is supplied to a light emitting diode 114 through a driver 113.

When a channel switching command signal is generated by the VCR 102, the command signal is supplied to the cable mouse 104. The microprocessor 112 of the cable mouse 104 converts the channel switching command signal into a channel switching command peculiar to the cable box 101. An infrared ray signal is generated by the light emitting diode 114 corresponding to the converted command signal.

The generated infrared ray signal is received by the infrared ray receiving portion 105 of the cable box 101.

When the cable mouse 104 is connected to the VCR 102 and the cable mouse 104 is positioned on the infrared ray receiving portion 105 of the cable box 101, the cable box 101 can be controlled using the VCR 102. Thus, operations such as a program reserving operation can be performed by the VCR 102.

Related art references are U.S. Pat No. 5,151,789 and U.S. Pat. No. 5,123,046.

As described above, the command signal CMD10 supplied from the VCR 102 is converted into a command peculiar to the cable box 101 by the microprocessor 112 of the cable mouse 104. However, when all commands are converted and output by the microprocessor 112 of the cable mouse 104, it is difficult to change and add commands. In other words, whenever a command is changed or added, the microprocessor 112 of the cable mouse 104 needs to be newly developed and replaced.

Thus, an object of the present invention is to provide an infrared ray generating apparatus an operation designating system for use with an electronic apparatus that allows a command to be easily changed and updated.

SUMMARY OF THE INVENTION

The present invention relates to an infrared ray generating apparatus, comprising a control means for converting a command signal of a first format into a command signal of a second format, switch means for selecting an input command signal or the command signal of the second format converted by the control means, and an infrared ray generating means for causing the switch means to select the command signal of the second format converted by the control means when the input command signal is not in accord with the second format and to select the input command signal when the input command signal is in accord with the second format and for generating an infrared ray signal corresponding to the command signal that is output from the switch means.

The input command includes a switch control signal. The switch means is switched corresponding to the switch control signal.

The switch means is switched corresponding to whether or not the input command signal is in accord with the second format.

The present invention also relates to an operation designating system for use with an electronic apparatus, the system comprising a first electronic device for generating a command signal of a first format and having a memory for storing a command signal of a second format, a control means for converting the command signal of the first format into the command signal of the second format, a switch means for selecting an input command signal or the command signal of the second format converted by the control means, an infrared ray generating means for causing the switch means to select the command signal of the second format converted by the control means when the input command signal is not in accord with the second format and to select the input command signal when the input command signal is in accord with the second format and for generating an infrared ray signal corresponding to the command signal that is output from the switch means, and a second electronic device whose operation state is designated corresponding to the command signal of the second format.

According to the present invention, and referring to FIG. 1 the cable mouse 4 has a switch circuit 43 that selectively outputs a command converted by the microprocessor 42 or an input command. The VCR 2 has a rewritable memory 25 in which a newly added command or an updated command is stored. A command signal can be output from the rewritable memory 25 corresponding to the state of the switch circuit 43 of the cable mouse 4.

Thus, even if a command is newly added or a command is updated, it can be rewritten to the memory 25. Consequently, it is not necessary to newly develop and replace the microprocessor 42 of the cable mouse 4.

The above and other objects, features and advantages of the present invention will become readily apparent from the following detailed description thereof which is to be read in connection with the accompanying drawings.

DETAILED DESCRIPTION OF PREFERRED EMBODIMENTS

Figure 1:
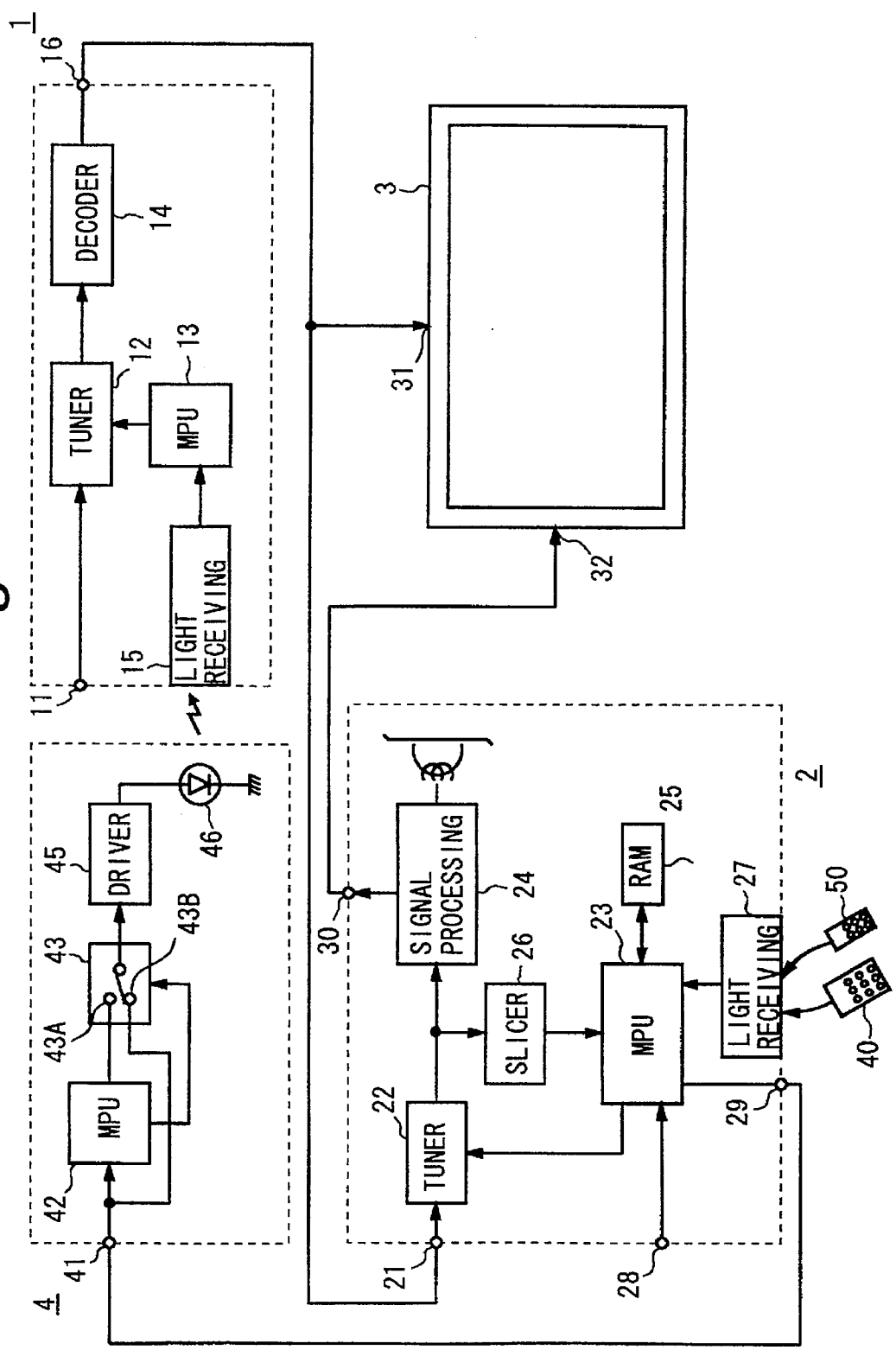
FIG. 1 is a block diagram showing an embodiment of the present invention.

Next, with reference to the accompanying drawings, an embodiment of the present invention will be described. FIG. 1 shows an embodiment of the present invention. In FIG. 1, reference numeral 1 denotes a cable box. Reference numeral 2 denotes a VCR. Reference numeral 3 denotes a TV receiver. Reference numeral 4 denotes a cable mouse.

A video signal is transmitted from a cable TV broadcasting station through a cable. The video signal is received by an input terminal 11 of the cable box 1. The video signal is supplied to a tuner circuit 12. The tuner circuit 12 designates a receiving channel corresponding to a control signal supplied from a microprocessor 13. A light receiving portion 15 receives a command signal. The output of the light receiving portion 15 is supplied to the microprocessor 13. The output of the tuner circuit 12 is supplied to a decoder 14. The output of the decoder 14 is output as an RF signal of the decoded video signal the video signal is modulated at a frequency of a desired channel) from an output terminal 16.

Output from the output terminal 16 is supplied to an antenna terminal 21 of the VCR 2 and an antenna terminal 31 of the TV receiver 3. A signal received by the antenna terminal 21 of the VCR 2 is supplied to a tuner circuit 22. The tuner circuit 22 designates a receiving channel corresponding to output from a microprocessor 23. A command for the microprocessor 23 is supplied from a commander 40. An infrared ray signal supplied from the commander 40 is received by a light receiving portion 27. The output of the light receiving portion 27 is supplied to the microprocessor 23. The output of the tuner circuit 22 is supplied to a signal processing circuit 24 that records and reproduces video signals. The output of the signal processing circuit 24 is supplied to an output terminal 30. The output of the output terminal 30 is supplied to a video input terminal 32 of the TV receiver 3.

The microprocessor 23 of the VCR 2 has a memory 25. As will be described later, the memory 25 stores data of a newly added command or data of a changed command.

When data of a newly added command or data of a changed command is received during a vertical blanking interval of the video signal, a slicer 26 detects the received data and sends the detected data to the microprocessor 23. Data of a command stored in the memory 25 can be updated or data of a new command can be stored in the memory 25 corresponding to the data of changed command or the data of a newly added command, respectively.

In addition, by supplying data of a new command and data of an updated command to the input terminal 28, data of a command stored in the memory 26 can be updated or data of a new command can be stored in the memory 25. Moreover, with a commander that operates the cable box 1, data of a command stored in the memory 25 can be updated or data of a new command can be stored in the memory 25.

A command signal is output from an output terminal 29. The command signal is supplied to an input terminal 41 of the cable mouse 4. The command signal is supplied to the microprocessor 42 and a terminal 43B of the switch circuit 43. The microprocessor 42 converts the command signal received from the microprocessor 23 of the VCR 2 into a command signal peculiar to the cable box 1. The output of the microprocessor 42 is supplied to a terminal 43A of the switch circuit 43.

The switch circuit 43 is controlled by the microprocessor 42. The switch circuit 43 outputs the command signal that is converted by the microprocessor 42 of the cable mouse 4 or the command signal supplied from the microprocessor 23 of the VCR 23. The output of the switch circuit 43 is supplied to a light emitting diode 46 through a driver 45. The light emitting diode 46 of the cable mouse 4 is positioned adjacent to the light receiving portion 15 of the cable box 1. Thus, the command signal converted by the microprocessor 42 of the cable mouse 4 or the command signal supplied from the microprocessor 23 of the VCR 23 is supplied to the light receiving portion 15. Consequently, the cable box 1 can be controlled using the VCR 2.

According to the embodiment of the present invention, since the command mouse 4 has the switch circuit 43, the light emitting diode 46 of the cable mouse 4 can selectively output the command signal converted by the microprocessor 42 of the cable mouse 4 or the command signal supplied from the microprocessor 23 of the VCR 23. Thus, a command can be easily added or updated.

In other words, when a command is changed or added, the data of the changed command or the data of the newly added command is stored in the memory 25 of the VCR 2. At this point, the switch circuit 43 is connected to the terminal 43B. Thus, the newly added command or the changed command is supplied from the memory 25 of the VCR 2 to the cable mouse 4. Thereafter, the command is supplied directly to the light emitting diode 46 through the switch circuit 43. Thus, corresponding to a newly added command or a changed command, the operation of the cable box 1 can be controlled.

As described above, a command can be newly added or changed during the vertical blanking interval of the video signal.

A command is added or changed when the data of the command is supplied to the input terminal 28. A command signal is generated by the commander 40 that operates the cable box. The command signal is supplied to the light receiving portion 27 and then stored in the memory 45.

Figure 2:
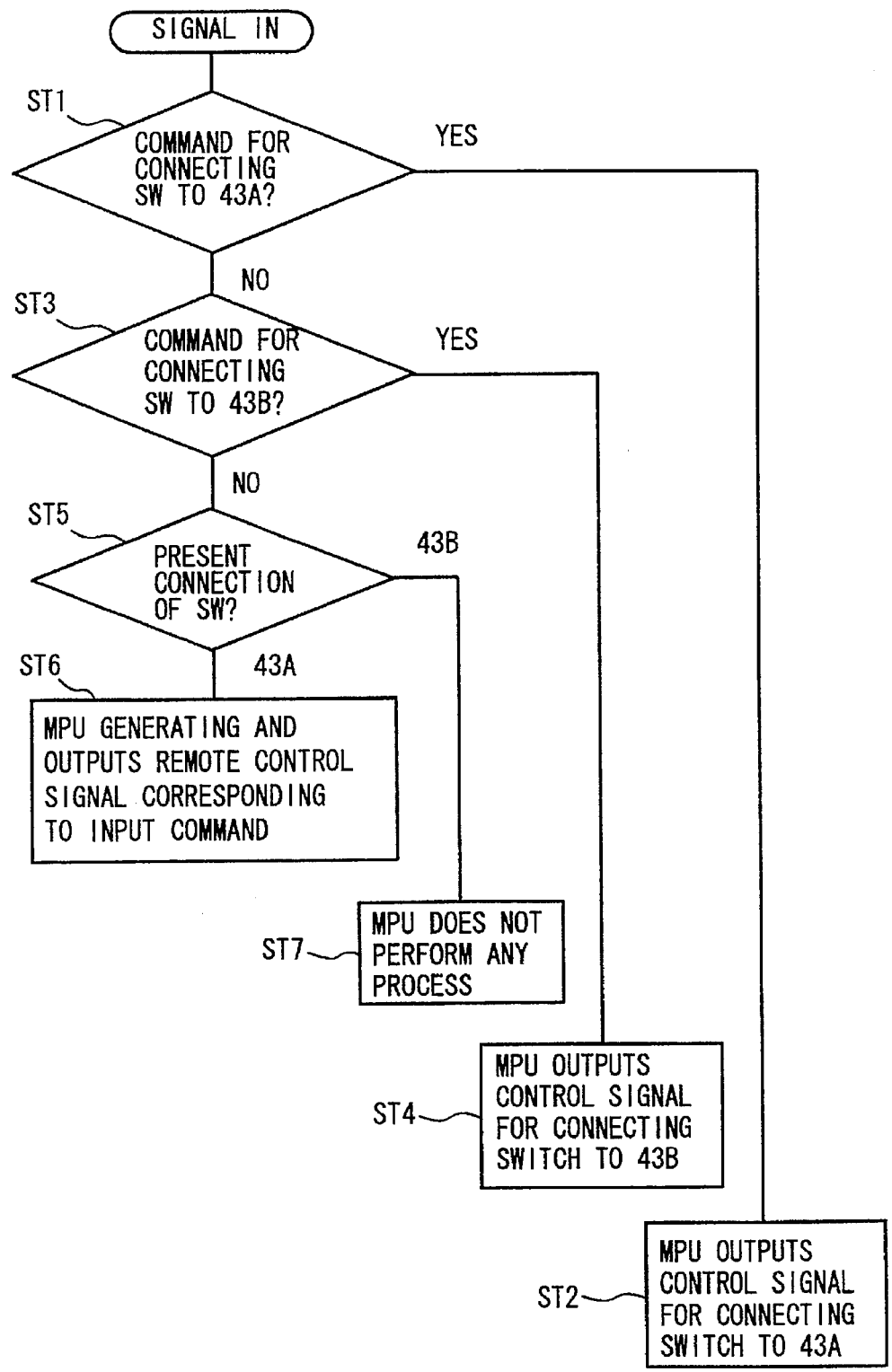
FIG. 2 is a flow chart showing an example of a control sequence of the embodiment of the present invention.

FIG. 2 is a flow chart showing an example of a control sequence of the microprocessor 42 of the cable commander 4. In this example, as shown in FIGS. 3A and 3B, a command for controlling the switch 43 is supplied from the VCR 2 to the cable mouse 4.

Figure 3A:
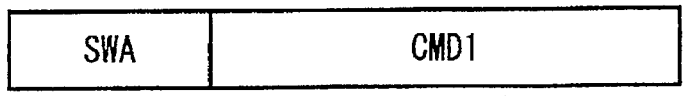
FIGS. 3A and 3B are schematic diagrams for explaining the embodiment of the present invention.
Figure 3B:

In other words, as shown in FIG. 3A, when the command signal that has been converted by the microprocessor 42 of the cable mouse 4 is output, a command signal SWA for connecting the switch circuit 43 to the terminal 43A is supplied. Thereafter, a command signal CMD1 that has not been converted is supplied. On the other hand, as shown in FIG. 3B, when the command signal is output from the microprocessor 23 of the VCR 23, a command signal SWB for connecting the switch circuit 43 to the terminal 43B is supplied. Thereafter, a command signal CMD2 that has been converted is supplied. Depending on these signals, the process as shown in FIG. 2 is performed.

It needs to be determined whether or not the command signal SWA for connecting the switch circuit 43 to the terminal 43A has been supplied (at step ST1). When the command signal SWA for connecting the switch circuit 43 to the terminal 43A has been supplied, a switch control signal for connecting the switch circuit 43 to the terminal 43A is supplied to the switch circuit 43 (at step ST2).

When the command signal SWA for connecting the switch circuit 43 to the terminal 43A has not been supplied at step ST1, it needs to be determined whether or not the command signal SWB for connecting the switch circuit 43 to the terminal 43B has been supplied (at step ST3). When the command signal SWB for connecting the switch circuit 43 to the terminal 43B has been supplied, a switch control signal for connecting the switch circuit 43 to the terminal 43B is supplied to the switch circuit 43 (at step ST4).

When the command signal SWB for connecting the switch circuit 43 to the terminal 43B has not been supplied at step ST3, the present state of the switch circuit 43 is obtained (at step ST5). When the switch circuit 43 has been connected to the terminal 43A, the input command CMD1 is converted and output (at step ST6). When the switch circuit 43 has been connected to the terminal 43B, the input command CMD2 is directly output (at step ST7).

Figure 4:
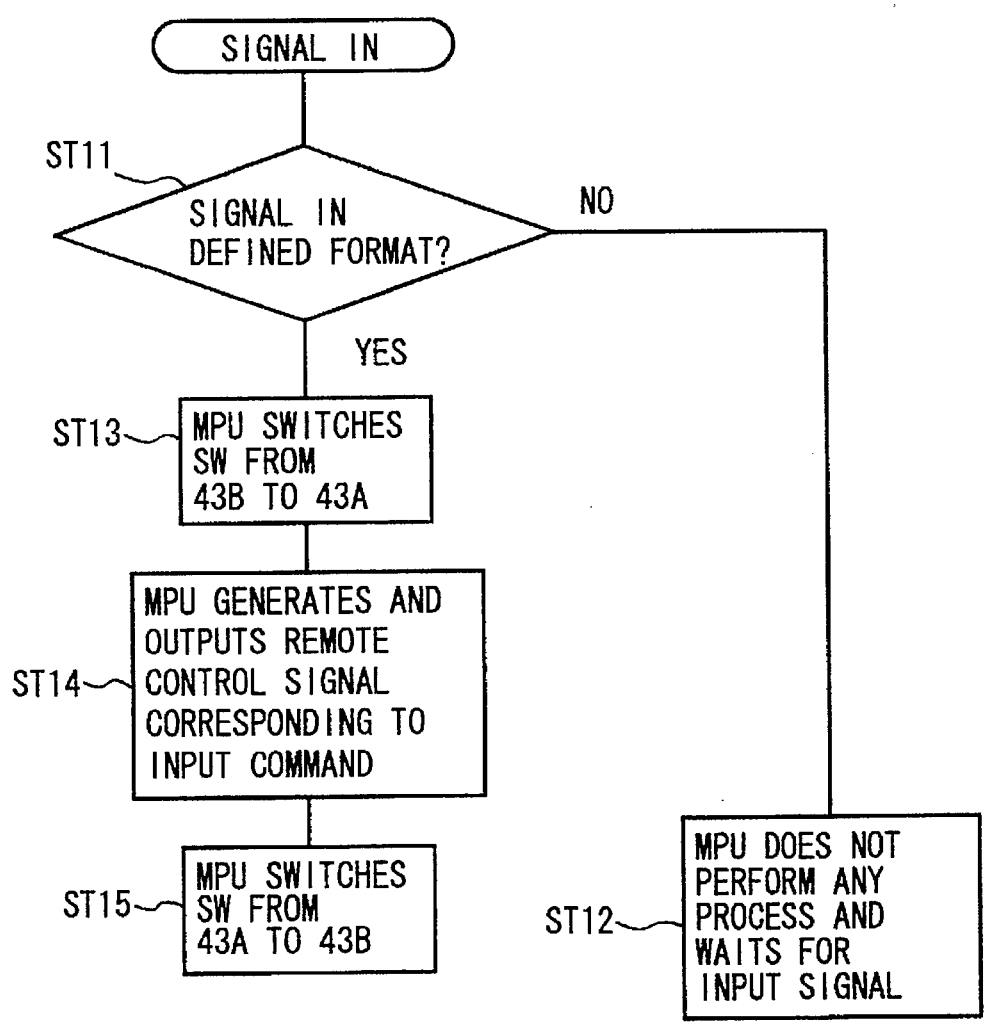
FIG. 4 is a flow chart showing another example of a control sequence of the embodiment of the present invention.

FIG. 4 is a flow chart showing another example of a control sequence of the microprocessor 42 of the cable commander 4. In this example, commands for switching the position of the switch circuit 43 are not required. It needs to be determined whether or not a command that is supplied from the VCR 2 to the cable mouse 4 is in accord with a predetermined format. Corresponding to the determined result, the position of the switch circuit 43 is switched.

Figure 5:
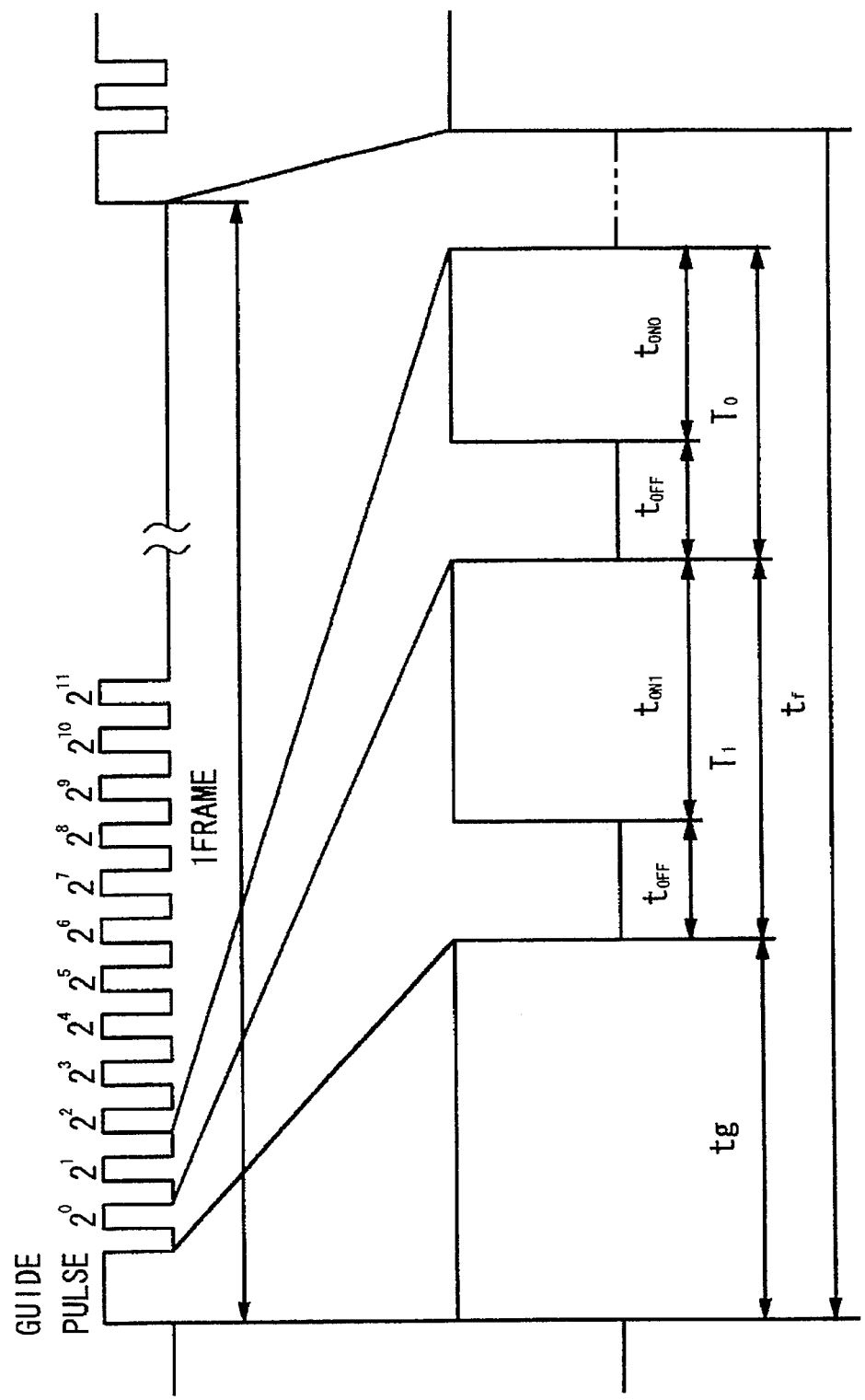
FIG. 5 is a schematic diagram showing wave forms for explaining the embodiment of the present invention.
Figure 6:
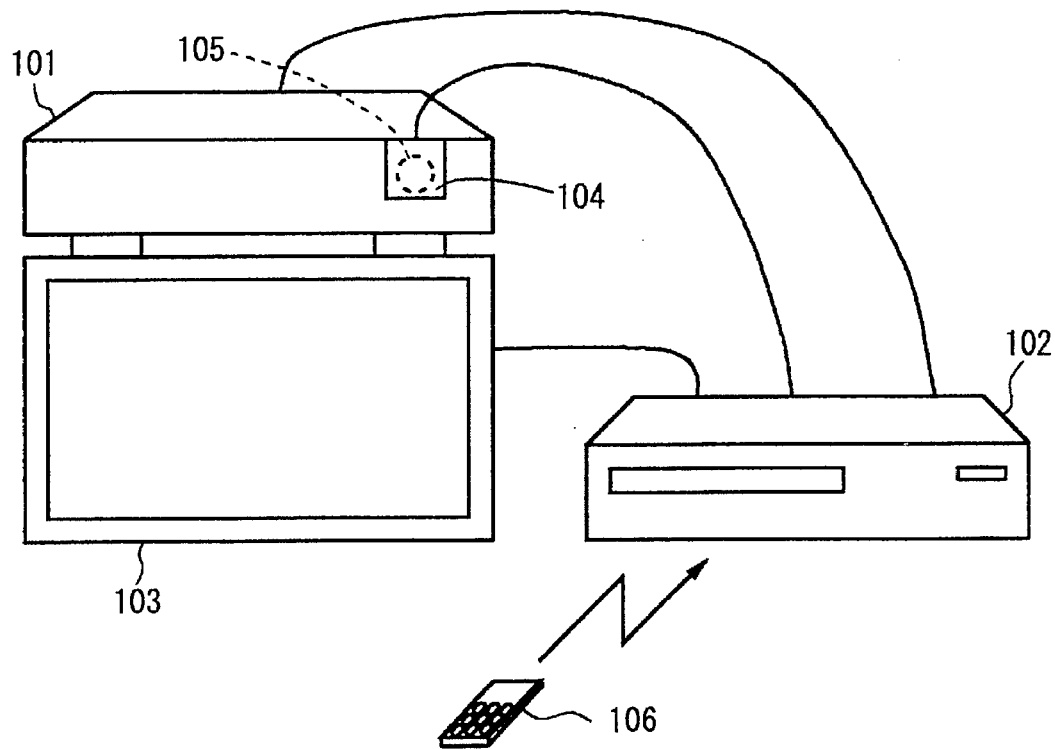
FIG. 6 is a schematic diagram showing a system using a cable box.
Figure 7:
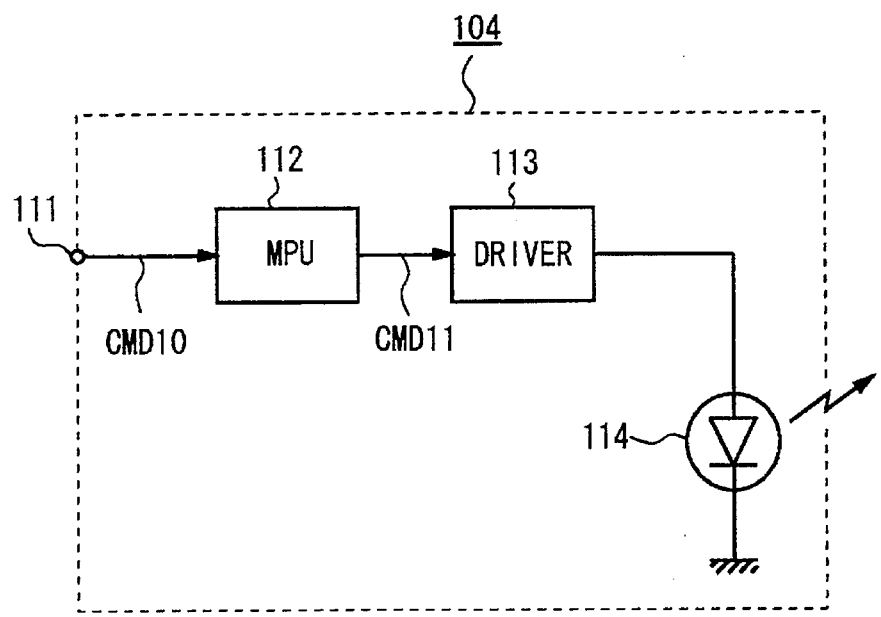
FIG. 7 is a block diagram for explaining a cable mouse.

The format of the command can be determined using a pulse width or a data width of the command signal as shown in FIG. 5. In other words, in the predetermined format, a guide pulse is followed by data. The length of the guide pulse and the widths of data "0" and data "1" have been defined as "tg", "T1", and "T0", respectively. Corresponding to the length "tg" of the guide pulse and the widths "T1" and "T0" of the data, it is determined whether or not the command is in accord with the predetermined format.

As shown in FIG. 4, it needs to be determined whether or not a signal that is in accord with the predetermined format has been received (at step ST11). The switch circuit 43 of FIG. 4 is connected to the terminal 43B. When the signal is not in accord with the predetermined format, the microprocessor waits for the next input signal (at step ST12). When the signal that is in accord with the predetermined format has been received, the switch circuit 43 is switched from the terminal position 43B to the terminal position 43A (at step ST13). Thereafter, the input command CMD1 is converted and output (at step ST14). After the converted command has been output, the switch circuit 43 is connected to the terminal 43B (at step ST15).

This application is related to the following Japanese patent applications.
05-210613 (filed on Aug. 25, 1993)
05-210605 (filed on Aug. 25, 1993)

Each of the above applications is owned by the assignee of the present invention and is hereby incorporated by reference.

Having described a specific preferred embodiment of the present invention with reference to the accompanying drawings, it is to be understood that the invention is not limited to this precise embodiment, and that various changes and modifications may be effected therein by one skilled in the art without departing from the scope or the spirit of the invention as defined in the appended claims.

What is claimed is:

1. An operation designating system for use with an electronic apparatus, the system comprising:
    a first electronic device in a first apparatus for generating an input command signal of a first format and having a memory for storing an updated command signal of a second format;
    input means in said first apparatus for inputting an updated command signal of said second format to said first electronic device for storage in said memory;
    control means in a second apparatus for converting the input command signal of the first format into a command signal of the second format;
    switch means in said second apparatus for selecting as an output signal one of the input command signal of the first format converted to the second format by the control means or the updated command signal of the second format from the first electronic device;
    wherein said control means causes the switch means to select the input command signal of the second format converted by the control means when the input command signal is not in accordance with the second format and to select the updated command signal when the updated command signal is in accord with the second format; and
    an infrared ray generator for generating an infrared ray signal corresponding to the output signal from the switch means transmitted to a third apparatus whose operation state is designed according to the command signal of the second format.

2. The operation designating system as set forth in claim 1,
    wherein the memory for storing the command signal of the second format is rewritable.

3. The operation designating system as set forth in claim 1,
    wherein said input means comprises a remote commander and the memory for storing the updated command signal of the second format is updated corresponding to an infrared ray signal supplied from said remote commander.

4. An operation designating method of an electronic apparatus having a first electronic device for generating a command signal of a first format and having a memory for storing an updated command signal of a second format, control means for converting the command signal of the first format into the command signal of the second format, and switch means for selecting one of an updated command signal of the second format or the command signal of the second format having been converted by the control means, comprising the steps of:

- determining whether a first command signal for controlling a switch circuit of the switch means has been supplied to an input terminal;
- connecting the input terminal to a second switch terminal and to an input of the control means;
- supplying a switch control signal to the switch means for connecting an output of the switch circuit to a first switch terminal when the first command signal is supplied to the input terminal;
- determining whether a second command signal for controlling the switch circuit has been supplied to the input terminal when the first command signal has not been supplied;
- supplying a switch control signal to the switch means for connecting the output of the switch circuit to the second switch terminal when the second command signal for connecting the switch circuit to the second terminal is supplied to the input terminal;
- maintaining a present state of the switch circuit when the second command signal for connecting the output of the switch circuit to the second terminal has not been supplied;
- converting an input command signal of the first format to the second format when the output of the switch circuit has been connected to the first switch terminal; and
- directly outputting an input command signal at the input terminal when the output of the switch circuit has been connected to the second switch terminal.

5. An operation designating method of an electronic apparatus having a first electronic device for generating a command signal of a first format and having a memory for storing an updated command signal of a second format, control means for converting the command signal of the first format into the command signal of the second format, and switch means for selecting the updated command signal or the command signal of the second format converted by the control means, comprising the steps of:

- determining whether a signal in accord with a predetermined format has been received;
- connecting an output of a switch circuit of the switch means to a second switch terminal and waiting for a next input signal when the received signal is not in accord with the predetermined format;
- switching the output of the switch circuit from the second switch terminal to a first switch terminal when the received signal is in accord with the predetermined format;
- converting an input command signal; and
- connecting the output of the switch circuit to the second terminal after the converted command signal has been output.

* * * * *